No. 812,395. PATENTED FEB. 13, 1906.
F. S. BELYEA.
PORTABLE DENTAL FURNACE.
APPLICATION FILED JUNE 2, 1904. RENEWED JAN. 9, 1906.
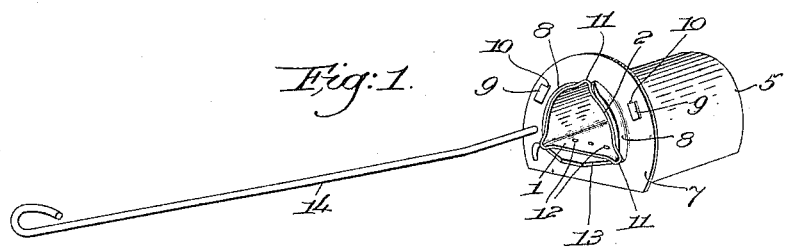
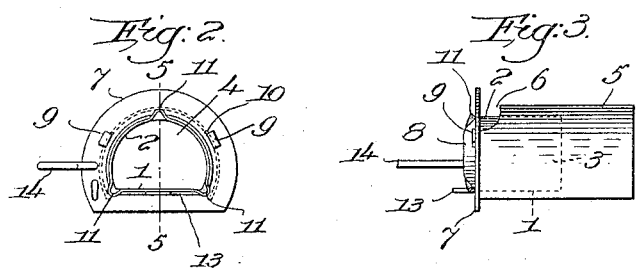
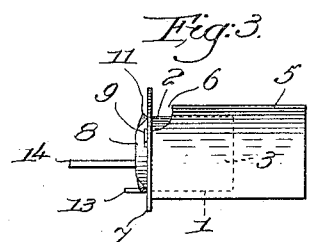
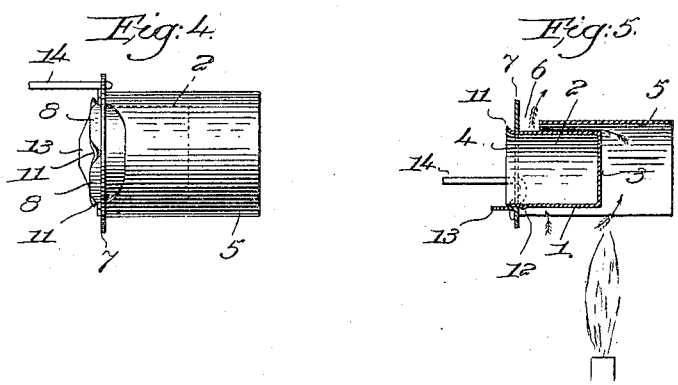
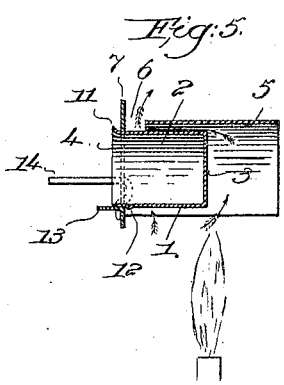
Witnesses,
Edward F. Allen.
Warren D. Owen
Inventor,
Frederick S. Belyea.
by Ensley Gregory,
attys.

UNITED STATES PATENT OFFICE.

FREDERICK S. BELYEA, OF BROOKLINE, MASSACHUSETTS.

PORTABLE DENTAL FURNACE.

No. 812,395.  Specification of Letters Patent.  Patented Feb. 13, 1906.

Application filed June 2, 1904. Renewed January 9, 1906. Serial No. 295,258.

*To all whom it may concern:*

Be it known that I, FREDERICK S. BELYEA, a citizen of the United States, and a resident of Brookline, county of Norfolk, State of Massachusetts, have invented an Improvement in Portable Dental Furnaces, of which the following description, in connection with the accompanying drawings, is a specification, like letters on the drawings representing like parts.

This invention has for its object the production of a compact, simple, and efficient portable dental furnace particularly adapted for making porcelain fillings. In the process of making such fillings a very thin gold or platinum lining is burnished into the properly-prepared cavity of the tooth, forming a matrix the exact shape of the cavity. Such matrix is carefully removed, filled with a moist porcelain compound, and baked, and when the baking is completed the matrix is stripped off and the hard filling is cemented into the cavity. The baking requires an intense heat, while the porcelain must be protected from direct contact with the flame, and various forms of furnaces have been devised for the purpose; but so far as I am aware they are comparatively large and heavy and require some special form of blowpipe or heating apparatus to raise the temperature to the proper baking-point.

In my present invention I have devised a furnace which is arranged on a suitable handle so that it may be held in the hand of the operator and readily turned in various directions during the baking, so that at any instant the contents may be observed and the condition of the baking filling noted. A common gas-flame from a Bunsen or other burner may be readily used with the aid of a blowpipe, the whole apparatus being of great simplicity in construction, of light weight, and capable of the greatest ease in handling.

The various novel features of my invention will be fully described in the subjoined specification and particularly pointed out in the following claims.

Figure 1 is a perspective view of a dental furnace and its handle embodying my invention looking into the open end or mouth of the muffle. Fig. 2 is a front elevation thereof. Fig. 3 is a side elevation of the furnace, the handle being broken off. Fig. 4 is a top or plan view thereof, and Fig. 5 is a longitudinal section of the furnace on the line 5 5, Fig. 2.

In accordance with the present embodiment of my invention the furnace comprises a muffle having an open mouth and a casing inclosing the muffle and having an open bottom and rear end, with an outlet in its top for the escape of flame and to induce a current of the burning gas or flame around the muffle. Means are provided to attach the muffle to the closed front end of the casing in such manner that the muffle may be readily attached to or removed therefrom, and a suitable handle to be grasped by the operator is secured to the casing.

The muffle, preferably made of platinum, comprises a flat bottom 1, a curved top and side portion 2, and a closed rear end 3 of such dimensions as will conveniently accommodate work of the character specified, the front end or mouth 4 of the muffle being open. A metallic shell-like outer casing 5, of German silver or other suitable heat-resisting material, is made in substantially semicylindrical form to inclose the muffle and leave a clearance between them, the bottom and rear end of the casing being open, as shown clearly in Fig. 5, and a vent-opening 6 is made in the top of the casing at or near its front end. The front end of the casing is closed by a plate 7, having an opening therein conforming to the perimeter of the muffle and extending laterally beyond the front edge of the casing, the latter having lugs 9 inserted in slits 10 in the plate and bent over, as in Figs. 1 and 2, thereby firmly connecting the body of the casing and its closed end. I have herein shown the plate 7 provided with forwardly-extended ears 8, adapted to frictionally engage and hold the sides of the muffle when inserted in the opening of said plate, the portion of the muffle projecting in front of the plate being pinched up, as at 11, to coöperate with the ends of the ears, and thereby prevent any twisting movement of the muffle. Several indentations 12 are preferably made in the muffle-bottom 1, just inside the plate 7, to assist in securing muffle and casing together, the means dedescribed for connecting the parts permitting ready insertion or removal of the muffle, if necessary. Below the mouth of the muffle the plate is provided with an ear 13, which projects in front of the mouth of the muffle at the bottom thereof, constituting a shield to prevent any flame from passing beneath the plate 7 and into the mouth of the muffle.

I have provided a handle 14 for the furnace, (shown as attached to the end plate 7 of the casing,) by which the operator holds the furnace during the baking operation.

When a filling has been prepared, it is placed in the muffle and the operator grasps the handle 14 and holds the furnace over the flame of a suitable blowpipe, so that the flame envelops the muffle between it and the casing, the arrows in Fig. 5 showing the direction of the flame. The outlet 6 permits the flame to escape at the top of the casing adjacent its front closed end, so that the bottom, sides, and rear closed end of the muffle will be enveloped by the flame, a strong heat being secured at the back of the muffle, where the filling to be baked is placed. The operator can turn or tip the furnace, as desired, during the baking and can at all times observe the progress of the baking through the open mouth of the muffle, the shield 13 preventing the entrance of any flame into the muffle, as direct contact of flame with the filling would injure the latter.

The weight of the furnace is so light that its manipulation is effected with the greatest facility by the operator, and no special form of heating apparatus is required.

Having fully described my invention, what I claim as new, and desire to secure by Letters Patent, is—

1. In a portable dental furnace, a metallic muffle having an open mouth, and a shell-like outer casing inclosing the muffle with a clearance between them and entirely open at its rear end and bottom, the muffle being attached to and supported by the closed front end of the casing.

2. In a portable dental furnace, a metallic muffle having an open mouth, a thin, shell-like casing inclosing the muffle with a clearance between them and entirely open at its rear end and bottom, the front end of the casing having an opening to receive the muffle, retaining-ears on said end of the casing to frictionally engage and hold the muffle in place within the casing, and a handle attached to the latter.

3. In a portable dental furnace, a metallic muffle having an open mouth, a metallic, shell-like casing inclosing the muffle with a clearance between them for the circulation of flame, the casing being entirely open at its rear end and bottom and having a closed front end through which the muffle is extended and to which it is attached, a shield projecting beyond the mouth of the muffle at the bottom thereof, and a handle attached to the casing.

4. In a portable dental furnace, a metallic muffle having an open mouth, a casing inclosing the muffle with a clearance between them for the circulation of flame, the casing being open at its rear end and bottom to expose the muffle to the direct flame and having a closed front end through which the muffle is extended and to which it is attached, the closed end of the casing being laterally extended beyond the perimeter of the muffle, and ears on said closed end of the casing to frictionally engage and retain the muffle in position in the casing.

5. In a portable dental furnace, a metallic muffle having an open mouth, a casing inclosing the muffle with a clearance between them for the circulation of flame, the casing being open at its rear end and bottom and having a closed front end through which the muffle is extended and to which it is attached, a shield projecting beyond the mouth of the muffle at the bottom thereof, ears on the closed end of the casing to frictionally engage and hold the muffle in position in the casing, and an elongated handle secured to the casing.

6. In a portable dental furnace, a metallic muffle having an open mouth, a metallic, semicylindrical outer casing inclosing the muffle with a clearance between them and having an opening in its top, the rear end and bottom of the casing being open and its front end closed, means to frictionally and detachably connect the muffle and the closed end of the casing, and an elongated handle secured to the latter.

In testimony whereof I have signed my name to this specification in the presence of two subscribing witnesses.

FREDERICK S. BELYEA.

Witnesses:
JOHN C. EDWARDS,
ELIZABETH R. MORRISON.